United States Patent
Ando (10) Patent No.: US 7,677,774 B2
(45) Date of Patent: Mar. 16, 2010

(54) VEHICLE INTERIOR ILLUMINATION APPARATUS

(75) Inventor: Yasuyuki Ando, Aichi-ken (JP)

(73) Assignee: Kojima Press Industry Co., Ltd. (JP)

( * ) Notice: Subject to any disclaimer, the term of this patent is extended or adjusted under 35 U.S.C. 154(b) by 0 days.

(21) Appl. No.: 12/330,177

(22) Filed: Dec. 8, 2008

(65) Prior Publication Data

US 2009/0262548 A1 Oct. 22, 2009

(30) Foreign Application Priority Data

Apr. 16, 2008 (JP) ............................. 2008-106603

(51) Int. Cl.
*B60Q 3/00* (2006.01)
(52) U.S. Cl. ...................... 362/488; 362/471; 362/479; 307/10.1
(58) Field of Classification Search ................. 362/205, 362/231, 240, 249.05, 251, 394, 395, 471, 362/478, 479, 488, 490; 200/600
See application file for complete search history.

(56) References Cited

U.S. PATENT DOCUMENTS

| | | | |
|---|---|---|---|
| 6,013,956 A * | 1/2000 | Anderson, Jr. ............. 307/10.1 |
| 6,464,381 B2 * | 10/2002 | Anderson et al. ........... 362/488 |
| 6,773,129 B2 * | 8/2004 | Anderson et al. ............. 362/84 |
| 7,002,089 B2 * | 2/2006 | Stevenson ................... 200/512 |
| 7,221,271 B2 * | 5/2007 | Reime ......................... 340/541 |
| 2006/0245200 A1 * | 11/2006 | Kuwana et al. ............. 362/488 |
| 2007/0211483 A1 * | 9/2007 | Ando et al. .................. 362/488 |
| 2008/0198613 A1 * | 8/2008 | Cruickshank ............... 362/488 |
| 2009/0229955 A1 * | 9/2009 | Hein et al. ................ 200/42.01 |
| 2009/0243791 A1 * | 10/2009 | Partin et al. .................. 340/5.2 |

FOREIGN PATENT DOCUMENTS

JP 2007-230450 A 9/2007

* cited by examiner

*Primary Examiner*—Hargobind S Sawhney
(74) *Attorney, Agent, or Firm*—Mills & Onello, LLP (57) ABSTRACT

A vehicle interior illumination apparatus includes a first type touch switch which turns illumination ON and OFF when a human body touches a surface of an illumination lens on a vehicle compartment side, and a second type touch switch which switches between linkage and non-linkage between ON and OFF of illumination and a state of a door when the human body moves on the surface of the illumination lens on the vehicle compartment side. The first type touch switch includes a first transparent electrode on a surface of the illumination lens on the light source side for detecting touch of the human body on the surface of the illumination lens on the vehicle compartment side, and the second type touch switch includes a plurality of second transparent electrodes on the surface of the illumination lens on the light source side for detecting movement of the human body on the surface of the illumination lens on the vehicle compartment side.

5 Claims, 7 Drawing Sheets

VEHICLE INTERIOR ILLUMINATION APPARATUS

PRIORITY INFORMATION

This application claims priority to Japanese Patent Application No. 2008-106603, filed on Apr. 16, 2008, which is incorporated herein by reference in its entirety.

BACKGROUND

1. Technical Field

The present invention relates to a structure of a vehicle interior illumination apparatus, and more particularly to a structure of a switch of the vehicle interior illumination apparatus.

2. Related Art

A vehicle interior illumination apparatus which illuminates the interior of a vehicle is provided on the ceiling of a vehicle compartment. The vehicle interior illumination apparatus includes a switch for switching operations, such as ON and OFF operations, and a push switch or a slide switch which is disposed on an operation panel of the vehicle interior illumination apparatus is often used. However, such a push or slide switch is small in size and is therefore difficult to locate in a portion with low visibility, such as the ceiling of the vehicle compartment, and therefore has a problem of poor operability. In order to deal with this disadvantage, a structure in which a whole lens surface of an illumination apparatus is formed as a depression surface of a push switch, so that the whole lens surface serves as a switch, has been proposed. However, even with this structure in which the whole lens surface is formed as a depression surface of the push switch, because the switch which is used is a seesaw switch or the like, the switching operation cannot be achieved unless a specific portion of the lens surface is depressed. As a result, a significant improvement in operability cannot be obtained.

In order to overcome the above difficulties, JP 2007-230450 A, for example, proposes a vehicle interior illumination apparatus which aims at improving the operability by providing a touch switch on a lens surface. The vehicle interior illumination apparatus described in this reference provides a switch in which a sheet-like transparent electrode is attached onto a surface of a lens on a light source side, through which light from the light source transmits to illuminate the vehicle compartment, and which controls an ON/OFF operation in accordance with a change in the stray electrostatic capacitance of the electrode caused by a surface of the lens on the vehicle compartment side being touched by a human being. This switch is advantageous in that because power ON and OFF can be achieved simply by touching the surface of the lens of the vehicle interior illumination apparatus on the vehicle compartment side, without direct contact with the electrode, deterioration of the electrode can be substantially prevented so that a switch with a long life and a stable operation can be achieved.

Here, vehicle interior illumination apparatuses provided on the ceiling of the vehicle compartment include, for example, those which operate ON and OFF due to a switching operation performed by a passenger, such as map lamps, and those which turn ON and OFF in conjunction with the operation of a vehicle portion such as a door. However, many of the map lamps developed in recent years are configured to illuminate not only a portion around passenger's hands intensively but also the whole interior of the vehicle compartment. In such a case, two different types of switches are necessary for a map lamp; one switch for turning the lamp ON and OFF by the operation of a passenger and the other switch for switching the linkage state between ON/OFF of the lamp and a door operation, for example.

Figure 7:
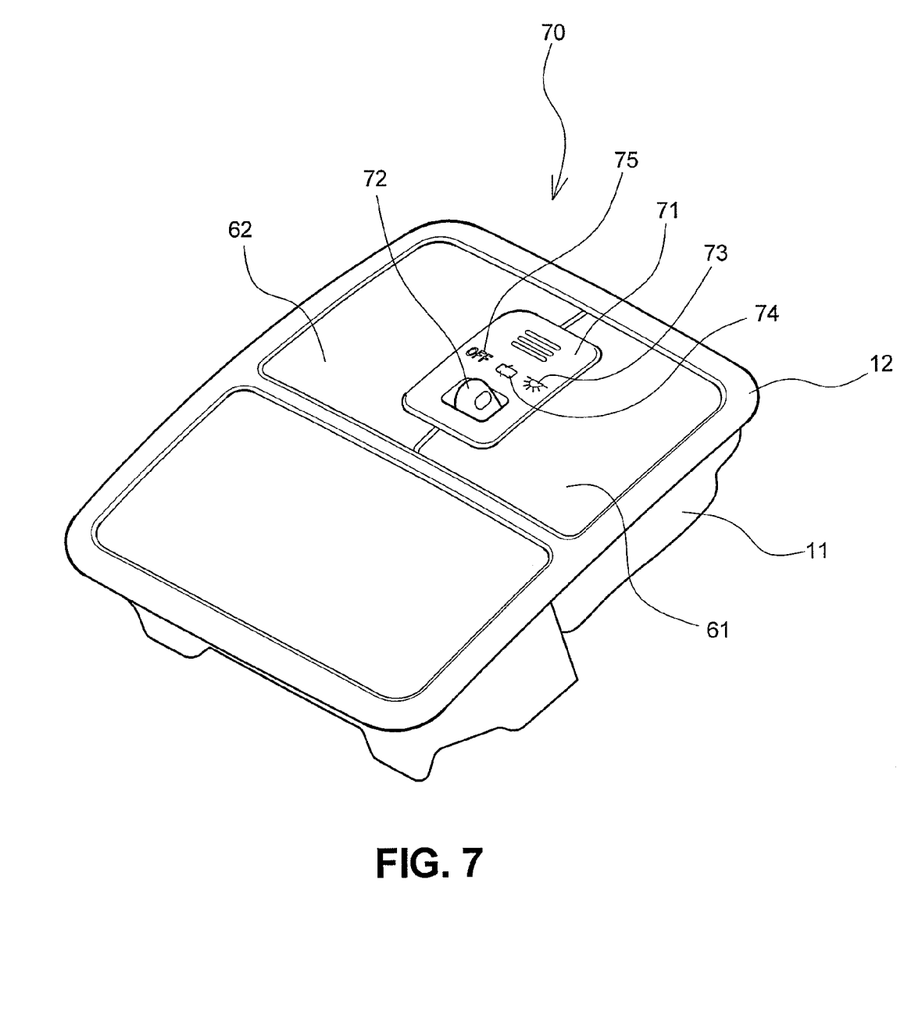
FIG. 7 is a perspective view showing a map lamp according to related art.

Referring to FIG. 7, a map lamp 70 of related art includes a case 11 to which a light source such as an illumination lamp is attached, a design panel 12 provided on the vehicle compartment side, and illumination lenses 61 and 62 through which light from the light source transmits. A transparent electrically conductive sheet for a touch sensor is attached on a surface of each of the illumination lenses 61 and 62 on the light source side, so that the light sources corresponding to the respective illumination lens 61 and 62 can be turned ON and OFF in accordance with a change in the electrostatic capacitance caused by a human being touching the surface of each of the illumination lens 61 and 62. A switch console 71 which is provided between the two illumination lenses 61 and 62 of the map lamp 70 includes a lighting mode change switch 72 which is used for switching the states in which the map lamp 70 is/is not turned ON and OFF in conjunction with the opening and closing operation of the door. The switch console 71 includes, on the surface thereof on the vehicle room compartment side, marks 73, 74, and 75 each indicating the position of the switch corresponding to the selected lighting mode. Specifically, the mark 73 indicates a knob position corresponding to a mode in which the map lamp 70 is continuously ON regardless of whether the door is opened or closed, the mark 74 indicates a knob position corresponding to a mode in which the map lamp 70 is turned ON and OFF in conjunction with the opening and closing of the door, and the mark 75 indicates a knob position corresponding to a mode in which the lamp 70 is continuously OFF.

Here, a lever switch is used as the lighting mode change switch 72, so that the switch of the map lamp 70 disposed on the ceiling which provides poor visibility can be operated without visual recognition. However, from a design viewpoint, the map lamp 70 which is formed in a flat plane shape having a switch knob protruding therefrom is not preferable in terms of design uniformity. Accordingly, there has been a desire for such a map lamp having a flat design. In order to meet this desire, it is conceivable, for example, to arrange the touch switches as described in JP 2007-230450 A in the periphery of the illumination lenses 61 and 62. This structure, however, also has a problem that, because it is necessary to provide a great number of touch switches in a narrow region, each touch switch has a small area, leading to a high frequency of erroneous operations.

Therefore, the present invention is aimed at suppressing erroneous operation with respect to the touch switches in a vehicle interior illumination apparatus.

SUMMARY

In accordance with an aspect of the invention, there is provided a vehicle interior illumination apparatus, including a light source, an illumination lens through which light from the light source transmits, a first type touch switch for turning illumination ON and OFF when a human body touches a surface of the illumination lens on a vehicle compartment side, and a second type touch switch for switching between a linkage mode in which ON and OFF of the illumination and a state of a door are associated with each other and a non-linkage mode in which ON and OFF of the illumination and a state of a door are not associated with each other, when the human body moves on the surface of the illumination lens on the vehicle compartment side.

Preferably, in the vehicle interior illumination apparatus of the present invention, the first type touch switch includes a first transparent electrode on a surface of the illumination lens on the light source side for detecting touch of the human body on the surface of the illumination lens on the vehicle compartment side, and the second type touch switch includes a plurality of second transparent electrodes on the surface of the illumination lens on the light source side for detecting movement of the human body on the surface of the illumination lens on the vehicle compartment side.

Preferably, in the vehicle interior illumination apparatus of the present invention, a plurality of light sources are provided, and the illumination lens is a common illumination lens including a plurality of regions through which light from the plurality of light sources transmits, respectively, and the first type switch includes a first group of transparent electrodes on each of the regions on the common illumination lens on the light source side for detecting touch of the human body on each of the regions on the vehicle compartment side, and the second type switch includes a second group of transparent electrodes on the surface of the common illumination lens on the light source side for detecting movement of the human body on the surface of the illumination lens on the vehicle compartment side.

In accordance with another aspect of the present invention, there is provided a vehicle interior illumination apparatus, including a light source, an illumination lens through which light from the light source transmits, and a touch switch which turns illumination ON and OFF when a human body moves in a first direction on a surface of the illumination lens on a vehicle compartment side and which switches between a linkage mode in which ON and OFF of illumination and a state of a door are associated with each other and a non-linkage mode in which ON and OFF of illumination and a state of a door are not associated with each other, when the human body moves in a second direction which is different from the first direction on the surface of the illumination lens on the vehicle compartment side.

Preferably, in the vehicle interior illumination apparatus of the present invention, the touch switch includes a plurality of transparent electrodes arranged in each of the first direction and the second direction on the surface of the illumination lens which is used for illumination on the light source side, for detecting movement of the human body in the first direction and/or the second direction on the surface of the illumination lens on the vehicle compartment side.

The vehicle illumination apparatus according to the prevent invention has an advantage that erroneous operations with respect to the touch switch can be suppressed.

BRIEF DESCRIPTION OF THE DRAWINGS

Preferred embodiments of the present invention will be described in detail based on the following figures, wherein.

DETAILED DESCRIPTION

Figure 1:
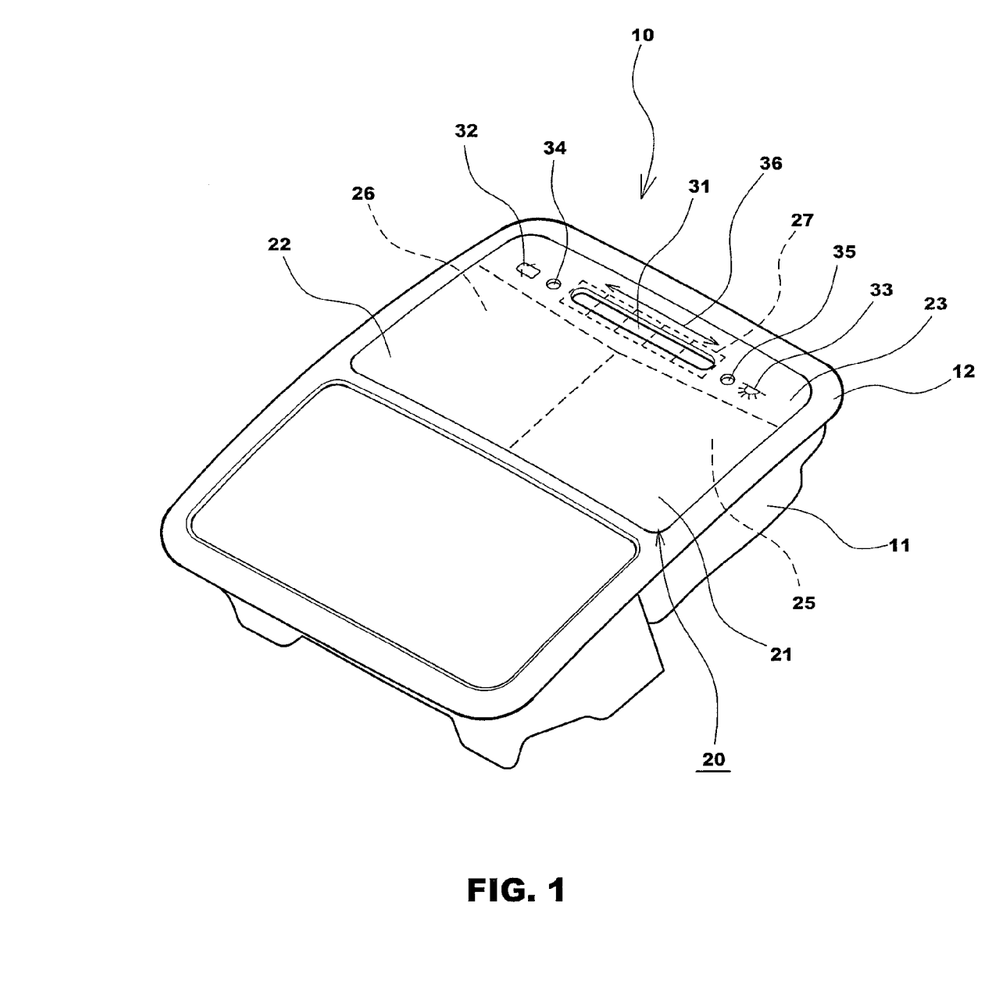
FIG. 1 is a perspective view showing a map lamp according to an embodiment of the present invention.
Figure 2:
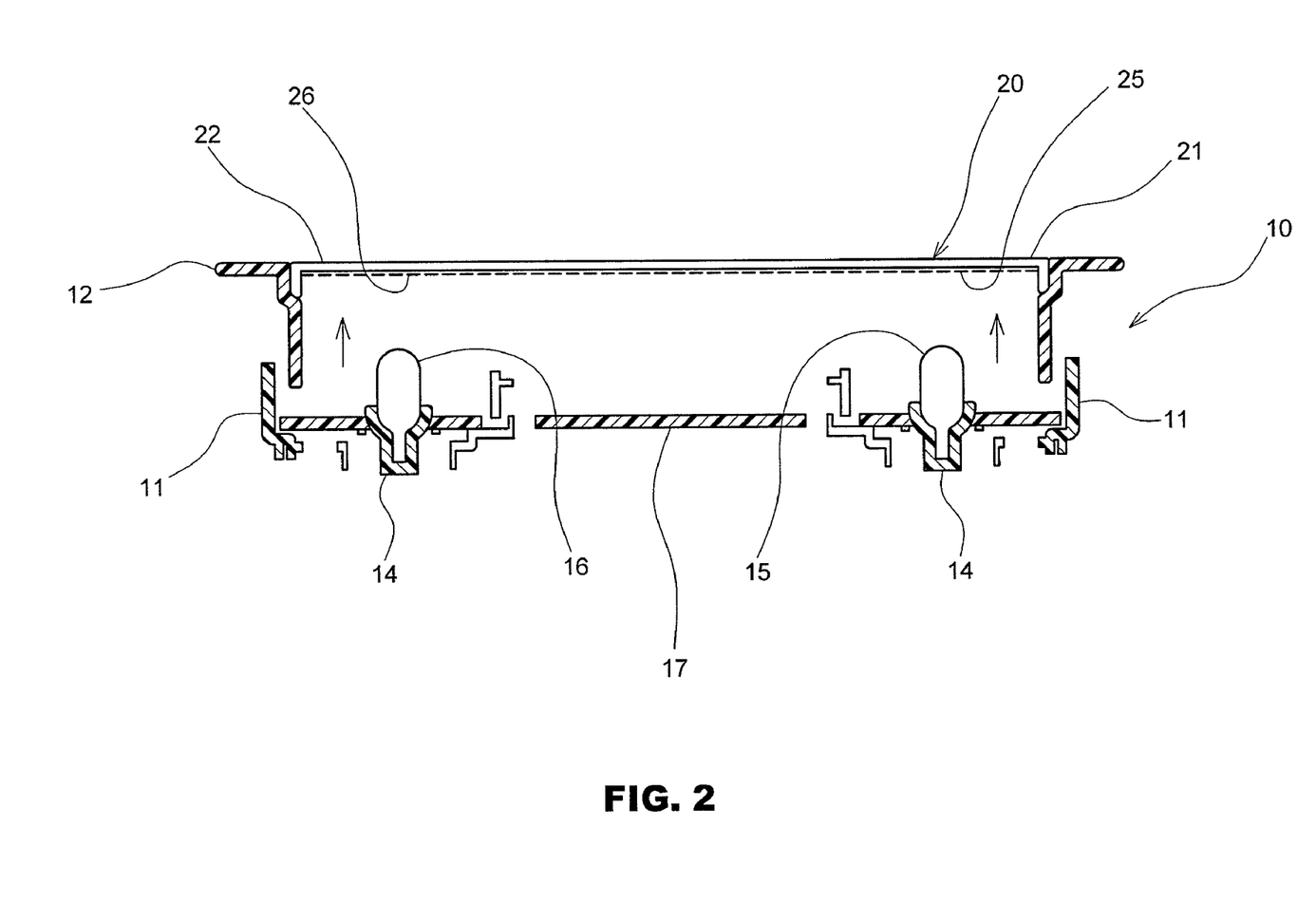
FIG. 2 is a cross sectional view of the map lamp according to the embodiment of the present invention.

Preferred embodiments of the present invention will be described in detail with reference to the accompanying drawings. As shown in FIG. 1, a map lamp 10, which is a vehicle interior illumination apparatus, includes a case 11 including bulbs 15 and 16 serving as light sources as shown in FIG. 2 and so on attached thereto, a design panel 12 provided on the case 11 on the side of the vehicle compartment, and an illumination lens 20 provided in a substantially coplanar manner with the surface of the design panel 12, through which light from the light sources transmits. The illumination lens 20 includes a first region 21 for illuminating the driver side, a second region 22 for illuminating the passenger side, and a third region 23 which is a region other than the first and second regions. The first region 21 and the second region 22 are larger than the third region 23. The case 11 includes bulbs 15 and 16 for illumination, in the portions corresponding to the regions 21 and 22, respectively. Further, transparent electrodes 25 and 26 are attached to the corresponding regions 20 and 21, respectively, on the surface thereof on the case 11 side (i.e. the light source side), so as to cover the range through which light from the bulbs 15 and 16 transmits.

The third region 23 of the illumination lens 20 includes, on the vehicle compartment side, a slot 31 extending in the width direction of the map lamp 10. Further, indicators 34 and 35 and marks 32 and 33 are provided on the respective sides of the slot 31. The indicator 34 adjacent to the mark 32 lights up during a mode in which the map lamp 10 turns ON and OFF in association with opening and closing of the door, and the indicator 35 adjacent to the mark 33 lights up during a mode in which the map lamp 10 is continuously ON. Also, an arrow is provided along the slot 31 for indicating the operation direction.

On a portion of the surface of the illumination lens 20 on the case 11 side (i.e. on the light source side) corresponding to the portion where the slot 31 is provided, a plurality of transparent electrodes 27 for use in a switch are arranged in a line, for switching between a linkage state in which the bulbs 15 and 16 are turned ON and OFF in conjunction with the operation of the door, and a non-linkage state in which the bulbs 15 and 16 are not turned ON and OFF in conjunction with the operation of the door.

Referring to FIG. 2, a base plate 17 is attached to the case 11 of the map lamp 10, and the bulbs 15 and 16 which are light sources are disposed on the base plate 17 via sockets 14. As shown in FIG. 2, the bulbs 15 and 16 are disposed in the first region 21 and the second region 22, respectively, and the corresponding transparent electrodes 25 and 26 are provided on the surface of the illumination lens 20 on the case 11 side (i.e. on the light source side). Here, each of the transparent electrodes 25 and 26 forms a first transparent electrode. Further, the transparent electrodes 25 and 26 collectively form a first group of transparent electrodes 28 shown in FIG. 4. Also, as shown in FIG. 2, the case 11 having the base plate 17 attached thereto and the design panel 12 having the illumination lens 20 attached thereto are combined in the vertical direction as indicated by an arrow in FIG. 2 to form an assembly.

Figure 3:
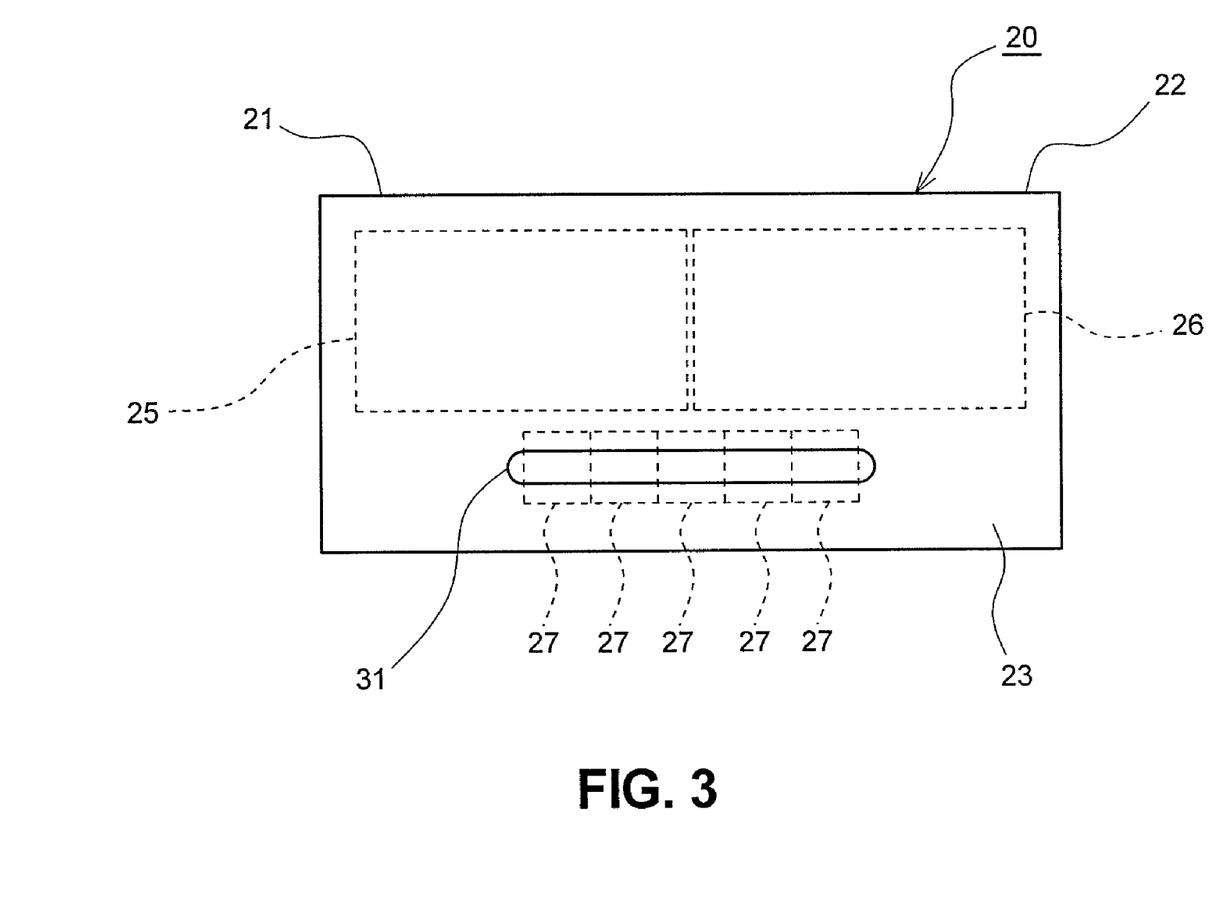
FIG. 3 is a plan view showing the arrangement of an illumination lens and transparent electrodes of the map lamp according to the embodiment of the present invention.

Referring to FIG. 3, the transparent electrode 25 and 26, which are provided adjacent to each other, are electrically insulated from each other. Further, in the present embodiment, five transparent electrodes are arranged in a line in the extending direction of the slot 31 on the portion of the illumination lens 20 corresponding to the portion where the slot 31 is provided. While these five transparent electrodes 27 are adjacent to each other, they are electrically insulated from each other. The five transparent electrodes 27 form a plurality of second transparent electrodes and also collectively form a second group of transparent electrodes 29 shown in FIG. 4.

Figure 4:
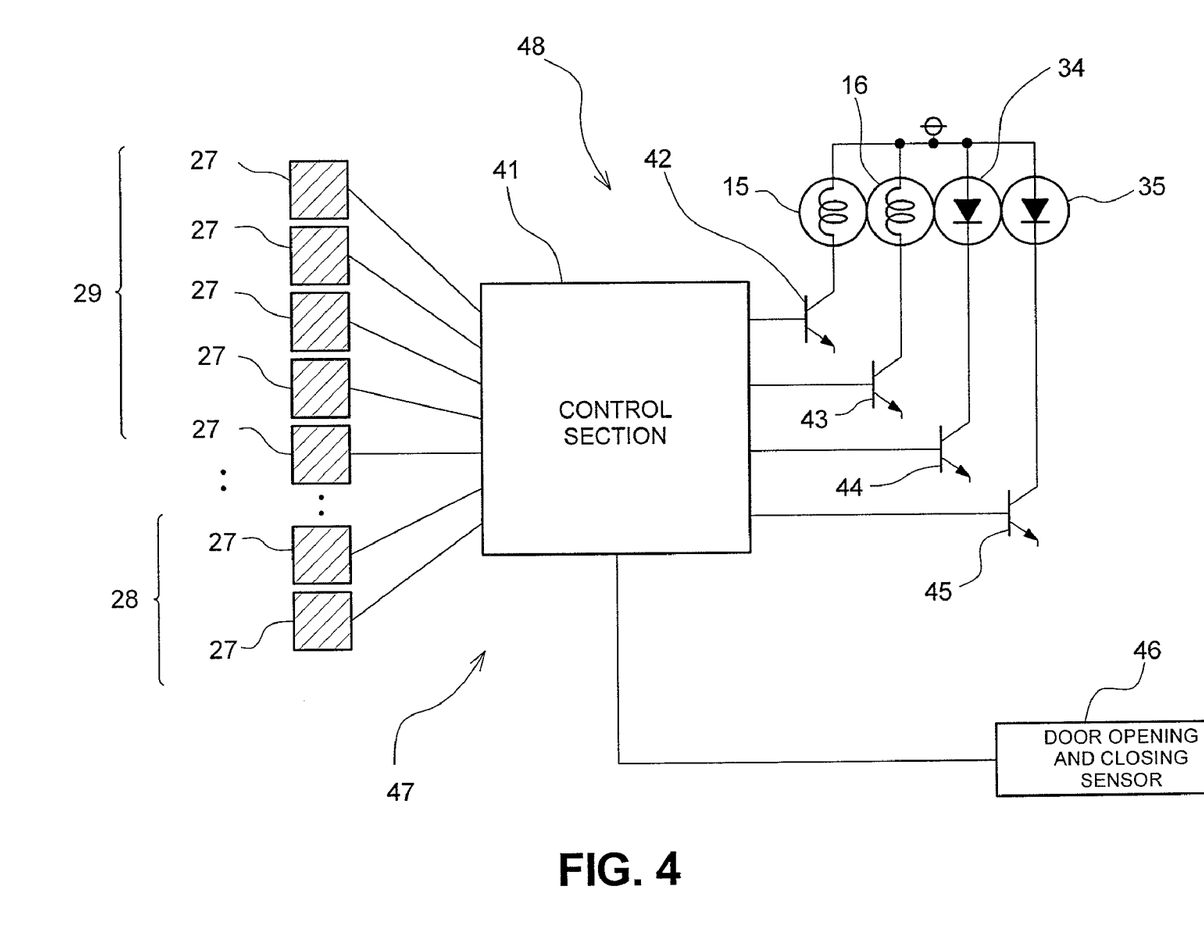
FIG. 4 is a diagram of the electrical system of the map lamp according to the embodiment of the present invention.

Referring to FIG. 4, the map lamp 10 includes a control section 41 for turning switching transistors 42 to 45 ON and OFF in accordance with a change in the electrostatic capacitance of each of the transparent electrodes 25, 26, and 27 to turn each of the bulbs 15 and 16 or the indicators 34 and 35 ON and OFF. The control section 41 may be a computer or an IC having an internal CPU or a storage region therein or may be formed by an electric circuit. Further, a door opening and closing sensor 46 for detecting the opened or closed state of the door is connected to the control section 41, so that a signal indicating the opened or closed state of the door is input to the control section 41. The transparent electrodes 25 and 26 provided in the first and second regions 21 and 22, respectively, and the control section 41 form a first type touch switch 47, and a set of five transparent electrodes 27 provided in the third region 23 and the control section 41 form a second type touch switch 48.

The operation of the map lamp 10 configured as described above will be described. When a passenger touches the surface of the first region 21 of the illumination lamp 20 on the vehicle compartment side shown in FIG. 1, the stray capacitance between the transparent electrode 25 and the passenger changes. The control section 41, in accordance with the change in the electrostatic capacitance, turns the bulb 15 provided in the first region 21 ON or OFF. This ON and OFF operation is repeated each time the electrostatic capacitance changes. Similarly, when the passenger touches the second region 22 of the illumination lens 20, the electrostatic capacitance between the transparent electrode 26 and the passenger changes, and the control section 41 turns the bulb 16 provided in the second region 22 ON or OFF in accordance with the change in the electrostatic capacitance.

When the passenger moves their finger in the right direction along the slot 31 while touching the surface of the illumination lens 20, the control section 41 detects a state in which the electrostatic capacitance of each of the five transparent electrodes 27 sequentially changes from the left side towards the right side. Conversely, when the passenger moves their finger in the left direction along the slot 31 while touching the surface of the illumination lens 20, the control section 41 detects a state in which the electrostatic capacitance of each of the five transparent electrodes 27 sequentially changes from the right side towards the left side. Then, the control section 41 determines the direction of the change in the electrostatic capacitance of these five transparent electrodes 27 to determine in which of the right and left directions the passenger's finger moves while touching the surface of the illumination lens 20. If the passenger's finger slides to the right (hereinafter referred to as "right slide"), for example, the control section 41 switches between a continuous light off mode and a continuous light on mode of the bulbs 15 and 16 in the first and second regions 21 and 22, respectively, each time the right slide is detected. If the passenger's finger slides to the left (hereinafter referred to as "left slide"), for example, the control section 41 switches between a linkage mode, in which the bulbs 15 and 16 in the first and second regions 21 and 22, respectively, turn ON and OFF in conjunction with the opening and closing of the door, and a non-linkage mode, in which the bulbs 15 and 16 in the first and second regions 21 and 22, respectively, do not turn ON and OFF in conjunction with the opening and closing of the door, each time the left slide is detected. In the door linkage mode, the control section 41 turns the switching transistor 44 ON to light up the indicator 34. In the door non-linkage mode, on the other hand, the control section 41 turns the switching transistor 44 OFF to extinguish the indicator 34. Here, the control section 41 does not determine the switching operation for switching between the operation modes even when the electrostatic capacitance of each of the set of five transparent electrodes 27 individually changes, and recognizes the switching operation to thereby switch between the linkage mode and the non-linkage mode or between the continuous light on mode and the continuous light off mode, only when detecting the shift of the change in the electrostatic capacitance in either left or right directions.

In a case where the door linkage mode is selected, when a door opening and closing signal from the door opening and closing sensor 46 indicates door opening, the control section 41 turns both the switching transistors 42 and 43 ON to light up the bulbs 15 and 16.

In the embodiment described above, in order to turn illumination of the first region 21 and the second region 22 of the map lamp 10 ON and OFF by means of the passenger's operation, the passenger touches the surface of the first or second region 21 or 22 on the illumination lens 20 on the vehicle compartment side to perform an ON and OFF operation. On the other hand, in order to switch between the linkage mode and the non-linkage mode between the bulbs 15 and 16 in the first region 21 and the second region 22 of the map lamp 10, and the door opening and closing operation, the passenger touches the third region 23 in a sliding manner (i.e. slide touch) to execute mode switching. Here, mode switching by simply touching the third region 23 is prohibited. As described above, the structure in which the touch switch capable of responding to two types of operations is disposed in the illumination lens 20 can achieve an advantage that the surface of the switch can be formed in a planar shape and also erroneous operations with respect to the switch can be suppressed. Further, with this structure, because the areas of the first region 21 and the second region 22 which are touched more often for turning ON and OFF the map lamp 10 are larger than the area of the third region 23 which is touched in a sliding manner less often for switching the modes, the erroneous operations can be further suppressed.

While in the embodiment described above, the linkage mode and the non-linkage mode in which the ON and OFF of illumination and the opening and closing operation of the door are associated or are not associated with each other are switched by touching the third region 23 in a sliding manner, it is also possible to switch between a linkage mode in which the ON and OFF of illumination and lock and unlock of the door are associated with each other, and a non-linkage mode in which the ON and OFF of illumination and lock and unlock of the door are not associated with each other, by touching the third region 23 in a sliding manner. In this case, the control section 41 is configured such that a signal from a door lock sensor attached to the door lock can be input to the control section 41. Then, when the door lock linkage mode is selected, upon receiving a door unlock signal from the door lock sensor, the control section 41 turns both the switching transistors 42 and 43 ON to light up the bulbs 15 and 16. Alternatively, it is also possible to switch between a linkage mode and a non-linkage mode in which ON and OFF of illumination and states of the door other than the opened and closed states or locked and unlocked states are associated or are not associated with each other, by touching the third region 23 in a sliding manner.

Figure 5:
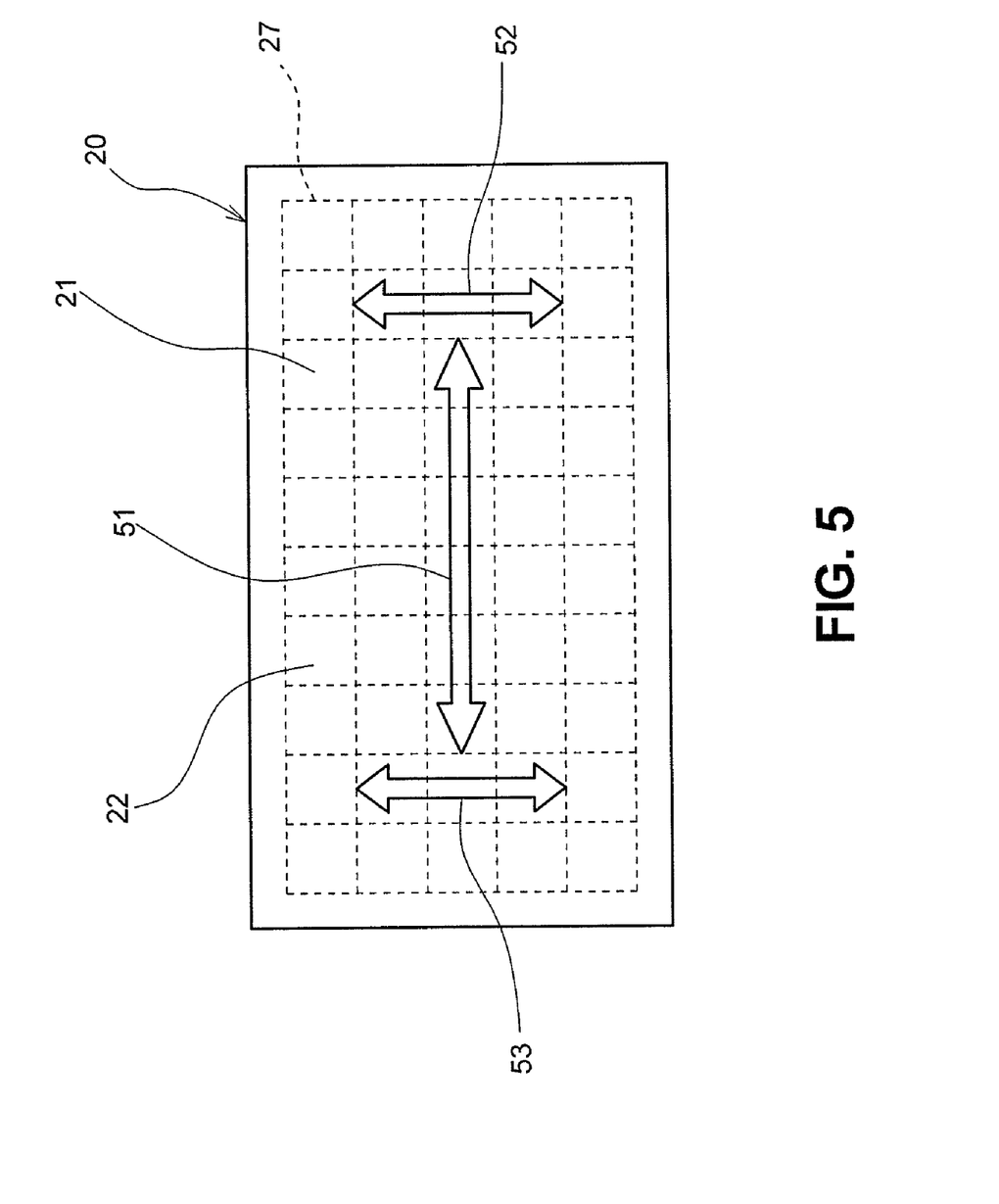
FIG. 5 is a plan view showing the arrangement of an illumination lens and transparent electrodes of a map lamp according to another embodiment of the present invention.
Figure 6:
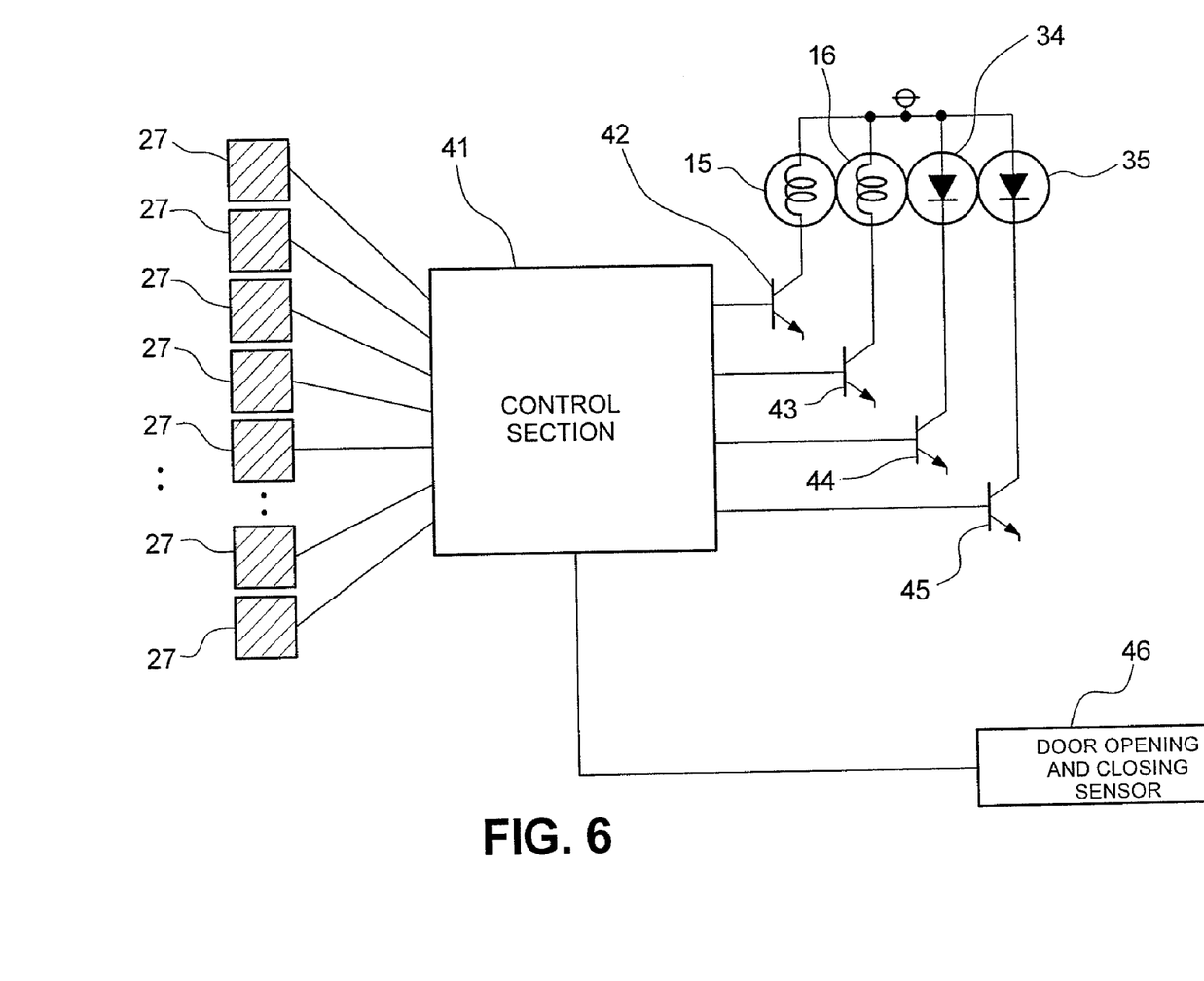
FIG. 6 is a diagram of the electrical system of the map lamp according to another embodiment of the present invention.

Referring now to FIGS. 5 and 6, another embodiment of the present invention will be described. In FIGS. 5 and 6, elements which are similar to elements described above with reference to FIG. 1 to 4 are designated by similar numerals and their description will not be repeated. As shown in FIG. 5, in this embodiment, a great number of transparent electrodes 27 are arranged in a matrix on the surface of the illumination lens 20 on the case 11 side (on the light source side). These transparent electrodes 27 are provided on substantially the whole surface of the lens 20. Further, as shown in FIG. 6, each of the transparent electrodes 27 is connected to the control section 41. Referring back to FIG. 5, when the passenger moves his finger in the direction of an arrow 51 on the surface of the illumination lens 20, the linkage mode and the non-linkage mode, in which the state of the door and ON and OFF of the bulbs 15 and 16 in the first and second regions 21 and 22 are associated or not associated with each other, are switched. When the passenger moves his finger in the direction of an arrow 52 on the surface of the illumination lens 20, the bulb 15 in the first region 21 is turned ON and OFF each time a sliding touch operation is performed, and when the passenger moves his finger in the direction of an arrow 53 on the surface of the illumination lens 20, the bulb 16 in the second region 22 is turned ON and OFF each time a sliding touch operation is performed.

According to the embodiment described above, because the switch is configured such that different switching functions can be achieved in accordance with the sliding direction, the erroneous operations with respect to the touch switch can be suppressed more efficiently.

While the preferred embodiments of the present invention have been described using specific terms, such description is for illustrative purposes only, and it is to be understood that changes and variations may be made without departing from the spirit or scope of the appended claims.

What is claimed is:

1. A vehicle interior illumination apparatus, comprising:
    a light source;
    an illumination lens through which light from the light source transmits;
    a first type touch switch for turning illumination ON and OFF when a portion of a human body touches a surface of the illumination lens on a vehicle compartment side of the illumination lens; and
    a second type touch switch for switching between a linkage mode in which ON and OFF of the illumination and a state of a door are associated with each other and a non-linkage mode in which ON and OFF of the illumination and a state of a door are not associated with each other, when the portion of the human body moves along the surface of the illumination lens on the vehicle compartment side of the illumination lens.

2. The vehicle interior illumination apparatus according to claim 1, wherein
    the first type touch switch includes a first transparent electrode on a surface of the illumination lens on the light source side of the illumination lens for detecting touch of the portion of the human body on the surface of the illumination lens on the vehicle compartment side of the illumination lens, and
    the second type touch switch includes a plurality of second transparent electrodes on the surface of the illumination lens on the light source side of the illumination lens for detecting movement of the portion of the human body on the surface of the illumination lens on the vehicle compartment side of the illumination lens.

3. The vehicle interior illumination apparatus according to claim 2, wherein
    a plurality of light sources are provided, and the illumination lens is a common illumination lens including a plurality of regions through which light from the plurality of light sources transmits, respectively, and
    the first type switch includes a first group of transparent electrodes on each of the regions on the common illumination lens on the light source side of the illumination lens for detecting touch of the portion of the human body on each of the regions on the vehicle compartment side of the illumination lens, and
    the second type switch includes a second group of transparent electrodes on the surface of the common illumination lens on the light source side of the illumination lens for detecting movement of the portion of the human body on the surface of the illumination lens on the vehicle compartment side of the illumination lens.

4. A vehicle interior illumination apparatus, comprising:
    a light source;
    an illumination lens through which light from the light source transmits; and
    a touch switch which turns illumination ON and OFF when a portion of a human body moves in a first direction along a surface of the illumination lens on a vehicle compartment side of the illumination lens and which switches between a linkage mode in which ON and OFF of illumination and a state of a door are associated with each other and a non-linkage mode in which ON and OFF of illumination and a state of a door are not associated with each other, when the portion of the human body moves in a second direction which is different from the first direction along the surface of the illumination lens on the vehicle compartment side of the illumination lens.

5. The vehicle interior illumination apparatus according to claim 4, wherein
    the touch switch includes a plurality of transparent electrodes arranged in each of the first direction and the second direction on the surface of the illumination lens which is used for illumination on the light source side of the illumination lens, for detecting movement of the portion of the human body in the first direction and/or the second direction on the surface of the illumination lens on the vehicle compartment side of the illumination lens.

* * * * *